United States Patent [19]

Narbeshuber

[11] Patent Number: 6,073,324
[45] Date of Patent: Jun. 13, 2000

[54] APPARATUS FOR CUTTING SHEET METAL DISC FROM AND WELDING SHEET METAL DISC TO SHEET METAL

[75] Inventor: Karl Narbeshuber, Berndorf, Austria

[73] Assignee: Berndorf Band Ges,, m.b.H., Berndorf, Austria

[21] Appl. No.: 08/899,153

[22] Filed: Jul. 23, 1997

[30] Foreign Application Priority Data

Jul. 23, 1996 [AT] Austria .................................. A1329/96

[51] Int. Cl.⁷ .................................................. B21B 15/00
[52] U.S. Cl. ........................... 29/33 K; 228/13; 228/119; 266/70
[58] Field of Search ........................ 29/33 K; 219/125.1; 228/13, 119, 171, 44.3, 45, 50; 266/70, 71; 83/451; 269/8

[56] References Cited

U.S. PATENT DOCUMENTS

| | | | |
|---|---|---|---|
| 1,348,363 | 8/1920 | Kilts et al. | 266/70 |
| 2,269,505 | 1/1942 | Anderson | 266/70 |
| 2,504,509 | 4/1950 | Erickson | 228/119 |
| 2,782,488 | 2/1957 | Anderson | 228/171 |
| 3,188,069 | 6/1965 | Chiamparino | 266/70 |
| 3,275,794 | 9/1966 | Dubusker et al. | 228/44.3 |
| 3,403,660 | 10/1968 | Delepiere et al. | 269/8 |
| 3,417,979 | 12/1968 | Cable . | |
| 3,569,658 | 3/1971 | Moore | 219/125.1 |
| 3,614,078 | 10/1971 | Hepler | 266/70 |
| 3,677,656 | 7/1972 | Buck | 408/76 |
| 3,941,358 | 3/1976 | Darling | 266/68 |
| 4,021,025 | 5/1977 | Frame | 266/70 |
| 4,049,183 | 9/1977 | Roden et al. | 228/50 |
| 4,256,288 | 3/1981 | Rojas . | |
| 4,283,617 | 8/1981 | Merrick et al. | 219/125.1 |
| 4,303,054 | 12/1981 | Lore | 269/8 |
| 4,330,076 | 5/1982 | Lollis et al. | 228/119 |
| 4,330,110 | 5/1982 | Creech | 26/70 |
| 4,362,077 | 12/1982 | Gerber | 269/8 |
| 4,392,604 | 7/1983 | Sears | 228/44.3 |
| 4,593,849 | 6/1986 | Doering | 228/45 |
| 4,687,385 | 8/1987 | Palm | 408/76 |
| 4,850,579 | 7/1989 | Fisher | 83/451 |
| 5,025,972 | 6/1991 | Finlan | 228/44.3 |
| 5,028,223 | 7/1991 | Ameter | 269/8 |
| 5,110,031 | 5/1992 | Rinaldi | 228/50 |
| 5,182,428 | 1/1993 | Jack et al. | 219/121.63 |
| 5,224,406 | 7/1993 | Nasu | 83/451 |
| 5,443,199 | 8/1995 | Krumszyn et al. | 228/45 |
| 5,575,971 | 11/1996 | Bond | 266/66 |
| 5,596,917 | 1/1997 | Gerber et al. | 83/451 |
| 5,836,224 | 11/1998 | Gerber | 83/451 |

FOREIGN PATENT DOCUMENTS

| | | |
|---|---|---|
| 871 994 | 3/1953 | Germany . |
| 1565632 | 7/1970 | Germany . |
| 223 385 | 6/1985 | Germany . |
| 41 07 833 | 9/1992 | Germany . |
| 08071791 | 3/1996 | Japan . |
| 1666286 | 1/1989 | Switzerland . |

*Primary Examiner*—Daniel W. Howell
*Assistant Examiner*—Christopher Kirkman
*Attorney, Agent, or Firm*—Jacobson, Price, Holman & Stern, PLLC

[57] ABSTRACT

An apparatus for cutting sheet metal discs (31) from and welding sheet metal discs (31), or other smooth-contoured sheet metal pieces, to a sheet metal strip (20) or other workpiece, particularly an endless sheet metal strip, e.g., in a double-strip press. The apparatus has guide for securing a cutting apparatus (34), welding apparatus, and a machining apparatus. The guide can be positioned on or against the sheet metal workpiece (20). The apparatus has a backing (32) positioned to support the disc about a weld seam to be produced. The guide (8) are held against the sheet metal strip by at least one electromagnet (2), preferably a plurality of electromagnets (2), and/or at least one vacuum element (35*a*, 35*b*, 35*b*, 35*c*), preferably a plurality of vacuum elements. Holding elements (12, 13, 14) are provided to secure the cutting and/or welding apparatuses (34, 34), which are moveable along the guide (8) by action of a motor (3).

19 Claims, 5 Drawing Sheets

APPARATUS FOR CUTTING SHEET METAL DISC FROM AND WELDING SHEET METAL DISC TO SHEET METAL

BACKGROUND OF THE INVENTION

1. Field of the Invention

The invention relates to an apparatus for cutting sheet metal discs from and welding sheet metal discs to sheet metal, which sheet metal may particularly be an endless strip, in a double strip press.

2. Description of the Related Art

Numerous fabricating apparatuses are known which employ sheet metal surfaces as working surfaces. The sheet metal may be in the form of a sheet piece or an endless strip. Generally, the surface of the workpiece has excellent surface uniformity. In the manufacture of, e.g., chipboard, particle board, plastic panels, plastic sheet, and plastic film, etc., the press plates are subjected to high thermal and compressive stresses. Bending of the sheet metal may result even in normal operation. Damage in the border region of the sheet metal may be readily repaired by excising the affected area of the sheet metal and inserting a new piece of metal. Damage in the interior of the sheet metal, which may be a sheet or an endless strip, is repaired similarly, using a discoidal or elliptical or other smooth-contoured piece (hereinafter, "sheet metal disc"), which is welded into place. The smooth contour avoids corners or other discontinuities which may introduce points of weakness.

The procedure used in welding-in such sheet metal discs according to the state of the art is as follows: The region to be replaced is measured, to allow the smallest possible substitution. A hole is drilled or burned in the center of the region to be excised. The course of the cut is marked out using a stencil, compass, or the like. Alternatively, a cutting apparatus, particularly a plasma cutter, can be moved manually along the cut, with the aid of guide means in order to eliminate the marking step. After the region to be replaced is excised in the predetermined dimensions, the cut edge is deburred and cleaned, such as by grinding, but taking care not to enlarge the cut. A pre-fabricated sheet metal piece (e.g., disc) is then positioned in the cut. A backing plate, which may have, e.g., copper inserts, may be used to ensure the planar positioning of the disc at the intended locus of the weld seam. The disc is then welded using a manually manipulated tungsten/inert gas welding apparatus, possibly followed by soft annealing of the weld region. The weld seam is then cold-hardened (e.g., by cold hammering) and is mechanically machined to the thickness of the sheet.

A disadvantage of such an arrangement is that even a small shift in the guiding of the cutting apparatus (e.g., plasma cutter) while excising the damaged region from the sheet metal can result in a mismatch to the replacement piece. Another disadvantage is that irregularities in manual movement of the cutting apparatus can lead to irregularities in the cut region which may weaken the resulting weld. Moreover, the weld quality depends strongly on the manipulative skill etc. of the person performing the weld. Hence, differences in timing of the weld, in particular, may also result in weld seam irregularities, which irregularities can eventually affect wide areas of the sheet metal.

In Ger. Pat. 871,994, a portable cutting apparatus for cutting steel rod and sheet is described. The apparatus employs an electromagnet whereby the apparatus can be held against the workpiece. A hinged straightedge is provided, for accurate positioning of the apparatus. An advantage asserted for this manual burn-cutting apparatus is that no backing is needed. Mechanical drive means may be employed for continuous movement of the burn-cutter.

U.S. Pat. No. 3,417,979 describes an apparatus for cutting and welding which has three adjustable tubular support pieces which are held against a magnetic sheet metal piece (i.e., workpiece) by means of permanent magnets or vacuum holding elements. These support pieces also bear:

guide means in proximity to the sheet metal piece;
 gear means (e.g., a toothed rim) above said guide means; and
 a support plate disposed along said gear means, which support plate is rotatable by an electric motor.

Said support plate bears a swingable arm which bears a downwardly directed welding torch, which torch is urged against the guide means by a spring. Accordingly, the welding torch is guided by the guide means, during the rotation of the support plate. Neither permanent magnets, nor the vacuum holding elements provided, are suitable to position the apparatus against the sheet metal workpiece with sufficient accuracy to produce highly accurate guiding of the cutting device or to provide the desired accuracy in the welding of the replacement piece. Whereas, it is stated in said U.S. patent document that the guide means may be used to effect welding onto a sheet metal workpiece, clearly the welding referred to is not welding-in of a replacement sheet metal disc but rather welding for purposes of resurfacing, augmenting thickness, reinforcing, or the like. Such welding does not require the same order of accuracy that is required for welding-in of a pre-fabricated replacement sheet in a recess cut into the sheet metal workpiece by the same apparatus.

SUMMARY OF THE INVENTION

The object of the invention is to devise an apparatus for cutting sheet metal discs from and welding sheet metal discs to sheet metal or the like, which apparatus enables high accuracy of cutting and enables the welding to be performed even by inexperienced personnel without giving rise to irregularities in the weld seam. The heat effects along the cut line and weld seam should be uniform. A further object of the invention is to provide means of achieving very high precision cutting of a region to be replaced.

The inventive apparatus for cutting sheet metal discs from and welding sheet metal discs to a sheet metal strip or other workpiece, particularly an endless sheet metal strip, e.g., in a double-strip press, said apparatus being comprised of:

guide means for a cutting apparatus which guide means can be positioned on or against the sheet metal workpiece;
 guide means for a welding apparatus which guide means can be positioned on or against the sheet metal workpiece; and
 a backing for the weld seam to be produced;
is characterized in that:
 the guide means are held against the sheet metal strip by means of at least one electromagnet, preferably a plurality of electromagnets, and/or at least one vacuum element, preferably a plurality of vacuum elements, which vacuum element(s) is/are connected to at least one vacuum pump (P); and in that the holding means for the machining and/or cutting and/or welding apparatuses are moveable along the guide means by action of a motor.

It is costly to replace a sheet metal piece of the type employed in machinery. It is particularly costly to replace an endless strip of the type employed in double strip presses and the like. Any means which avoids such replacement is of great interest. Means of repairing a sheet metal piece in situ in production machinery are desirable, and means of repairing an endless strip in situ are particularly desirable. The repair technique must not pose a danger of damaging the production machinery itself. It is critical to be able to accurately excise the damaged region of the sheet metal piece; such accuracy is provided by guide means which can be applied against the sheet metal piece.

In particular, in order to achieve high cutting accuracy, means of positioning the guide means accurately against the sheet metal piece must be provided. Precision in the dimension transverse to the cut and transverse to the weld seam (in the case of welding) is important. Electromagnets or vacuum elements (said vacuum elements being evacuated by an applied vacuum from a vacuum pump) may be employed to achieve positioning accuracy. The width of cut and the width of the weld seam (in the case of welding) can be controlled by a motor which moves the cutting and welding apparatuses along the guide means.

Electromagnetic workpiece-positioning devices for holding steel plates which are to be joined are disclosed in, e.g., E. Ger. Pat. 223,385 and Ger. OS 15 65 632. Both of these devices are intended for use with essentially straight weld joints. Thermal expansion of the sheet metal pieces undergoing welding, with respect to the magnetic holding device(s), is compensated by heat absorption by said holding device(s) and/or by small movements in the longitudinal direction of the weld seam. When the devices are used for cutting or joining a locus comprising a closed curve, e.g., excising a disc of sheet metal, the sheet metal edges are heated as with a straight joint. This causes the length of the edges to elongate. However, this elongation cannot be compensated by shifts in the longitudinal direction of the weld seam. Consequently, highly forceful warping of the edge regions of the sheet metal experiencing thermal stressing in the cutting or welding process occurs. It was discovered, in connection with the present invention, that the guide means held by electromagnets and/or by vacuum elements with associated vacuum pumps can reliably provide accurate predetermined positioning, for welding-in a replacement piece as well as for excising a damaged region.

It is known to employ so-called vacuum lifting elements to lift loads such as sheet metal pieces, glass plates, or the like. Such lifting elements generally have a ring-shaped sealing element which is held in a groove of a steel plate or the like. When the sealing element is placed against the sheet or the like, a closed space is formed which can be evacuated to some extent by a vacuum pump. The highest holding force per sq cm which can be developed in this manner is 1 kp/sq cm; this establishes the parameter for the dimensioning of the vacuum lifting element(s) as a function of the required holding force (i.e., the weight of the load).

The vacuums generally developed in vacuum lifting elements are not high vacuums. When heating occurs, e.g., in a welding operation or the like, the strength of the vacuum is substantially diminished, reducing the force exerted by the vacuum element on the sheet metal or the like. An essential feature of the present invention, not suggested by the prior art, is that one can keep the effects of heating on the vacuum element(s) small enough to make it practicable to employ vacuum elements to exert the required forces to serve as holding devices for positioning and holding the guide means and the sheet metal discs. One reason why this is possible is that the use of the proposed guide means enables high cutting and welding speeds to be achieved.

If at least one anchor component (rear-applied holding piece or the like) is employed with the electromagnet(s), which anchor is disposed against the sheet metal workpiece on the face of said workpiece which is the more distant from the electromagnet, the guide means can be held against the sheet metal workpiece without relying on the magnetic properties of the sheet metal, because the critical holding force will now be supplied by the anchor rather than by the magnetic interaction between the electromagnet and the sheet metal. This allows the use of the inventive cutting and welding apparatus to perform operations on paramagnetic or diamagnetic sheet metal workpieces. Even when the sheet metal is ferromagnetic, the use of the described anchor enhances the positioning and holding of the inventive apparatus at a given location against the workpiece.

A ring-shaped support element, which may comprise the described anchor, may be employed which has holding means for the backing and/or for a collecting pan, which backing and/or pan is/are moveably or releasably connected to said ring-shaped support element. The accurately positionable pan affords ready means of collecting solidified metal drippings, metal cuttings, and the like. Thus, if, e.g., an endless strip is operated on in situ in a production machine, one avoids soiling of the machine. By exact positioning of the backing for the welding operation, sagging or downward protrusion of the weld seam is avoided; this also tends to improve weld quality.

If a bearing, particularly a roller bearing, is provided for the guide means, which bearing is connected on one side to the electromagnet(s) and/or the vacuum element(s), and on the other side to a support bracket (which is not the same as the ring-shaped support element comprising the backing etc.), particularly simple means of cutting and welding of circular discs are provided, herein the kinematic link between the fixed part and moveable part is furnished by proven robust structural elements.

If the support bracket extends diametrically across the bearing, a space-saving configuration is achieved whereby the same support bracket can be used for all circular cutting operations and welding operations of different diameters.

If the support bracket has a plurality of holding means each of which is disposed at a different distance from the center of the bearing, the apparatus can be easily preadjusted for sheet metal discs of different diameters, and in particular one may employ standard pre-fabricated sheet metal discs to be welded into the sheet metal workpiece, generally without the need to make additional small adjustments in the diameter of the cut during the cutting and at the time of the welding.

If the motor with a drive gear or pinion is disposed on the support bracket, which drive gear or pinion engages a gear (or toothed rim) disposed concentrically with the bearing, and said engaged gear (or toothed rim) is held by the electromagnet(s) and/or the vacuum element(s), a space-saving configuration is provided which is particularly advantageous for operating on an endless sheet metal strip in situ in a production machine.

The support bracket may be fashioned with an arm which bears an additional holding device which arm is preferably also connected to an internal race of the bearing. The arm provides robust positioning of said additional holding device, and improved ability of the system to withstand mechanical stresses without the need to adjust relative positions of components of the apparatus with respect to the workpiece.

If the support bracket has a central opening, particularly a circular opening, the axis of which is normal to the sheet metal strip, additional positioning accuracy is afforded, wherewith in coordination with a recess provided in the sheet metal workpiece, one can easily and accurately center the guide means and the anchor component.

A centering pin can be disposed in the opening in the support bracket, such that the pin extends downwardly over the sheet metal strip. The pin can be centered together with the ring-shaped support element (which support element may be comprised of the anchor component). The centering may preferably be accomplished with the aid of a collecting pan. The centering provides a simple arrangement that is easy to mechanically adjust. In addition, the apparatus is particularly well adapted to executing the operating path, and in particular for cutting to excise a sheet metal disc and no additional centering means are needed.

At least one additional electromagnet and/or vacuum element may further be disposed between the support bracket and a sheet metal disc, which disc is held in position. The electromagnet and/or vacuum element may be used to more accurately hold said disc in a prescribed position, improving the accuracy of subsequent operations, e.g., welding of said disc into the sheet metal workpiece.

The backing may further be comprised of ferromagnetic material, and has inserts comprised of copper or the like in the region of the weld seam which is to be produced, wherewith the material of said inserts is generally immiscible with the material of the weld seam. This backing provides a magnetic anchor to hold the sheet metal disc in place and also a means of preventing sagging or downward protrusion of the weld seam.

If the support bracket bears a holding device for an eccentric bushing for a milling machine or the like, which has an axis disposed approximately perpendicularly to the plane of the sheet metal strip, particularly simple means of dealing with irregularities in the cutting curve (e.g., solidified metal globules) are afforded. In particular, the eccentric bushing enables particularly accurate adjustment of a milling machine or the like for machining the metal edges.

The vacuum element(s) and/or electromagnet(s) may be disposed in a hollow profile which has a generally ring-like shape (i.e., is a profile of revolution), wherewith said profile bears an outer race of the bearing and possibly also bears a gear (toothed rim) (e.g., the described driven gear). By appropriate configuring of said profile, e.g., with working edges that are disposed close to the outer bounds of the electromagnets, one can ensure that a uniform compressive holding force is exerted even if an electromagnet and/or a vacuum holding element fails during a holding stage. The relatively small surfaces of the said working edges enable one to exert a relatively high holding pressure.

If the driven gear (or toothed rim) has outwardly directed teeth, the ability to meet very fine tolerances is provided, with high reproducibility among a series of cutting and/or welding operations.

If the principal vacuum elements are formed by the hollow profile itself, wherewith a sealing element is provided on the end face of said profile directed toward the sheet metal workpiece to establish a seal between said profile and said sheet metal workpiece, a particularly simple and lightweight apparatus is provided which can be particularly accurately positioned and manipulated by the operator.

BRIEF DESCRIPTION OF THE DRAWINGS

The invention will be described in more detail hereinbelow, with reference to the drawings.

DETAILED DESCRIPTION OF THE PREFERRED EMBODIMENT

Figure 4:
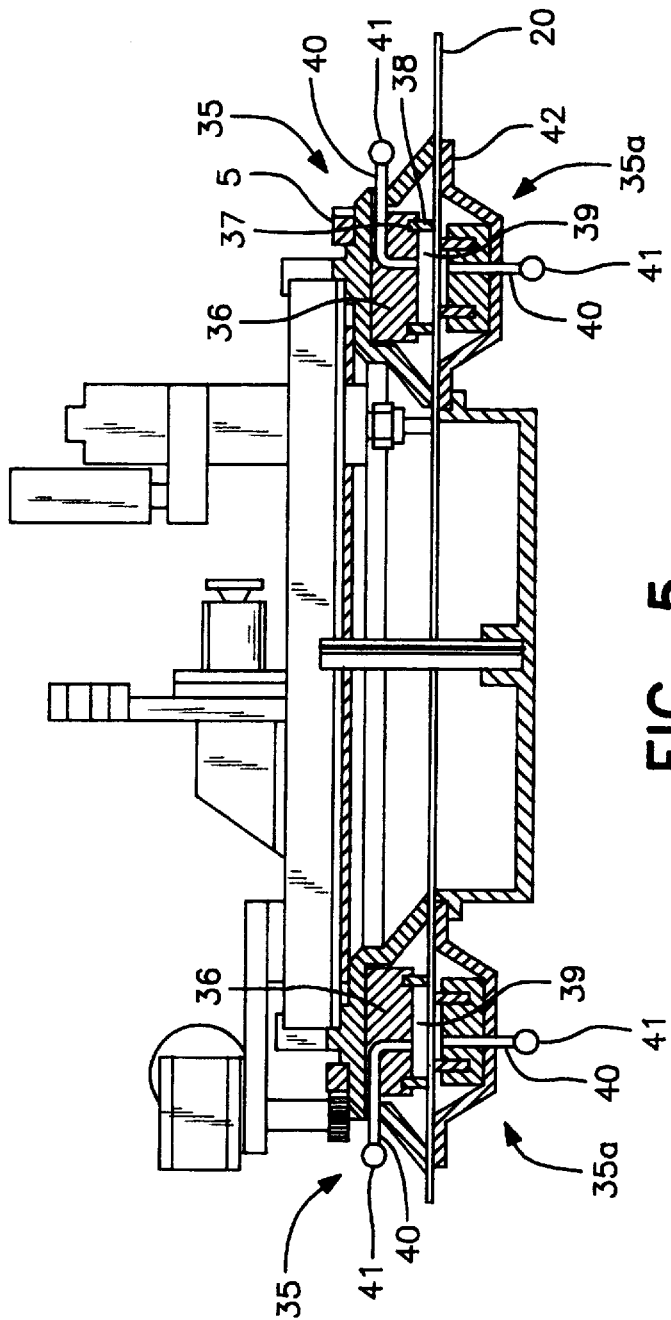
FIG. 4 is a view according to FIG. 3, but with vacuum suction elements.

The hollow, non-ferromagnetic annular section 1, comprised of aluminum material, accommodates twelve cylindrical electromagnets 2. Alternatively, as shown in FIG. 4, vacuum elements may be used instead of the electromagnets. The hollow profile 1 and the magnets 2 may be cooled, e.g., internally, by circulating water. The north pole of each cylindrical electromagnet is disposed in the center of the magnet, and the locus of the south pole is an annular shape, (i.e., cylinder) disposed at a distance from said center. The power supply of the electromagnets is 24 V DC, and the current in each magnet is 0.6 A. The electromagnets are connected in parallel. Each electromagnet 2 has a display device connected in series with it. When the electromagnet 2 is not in operation, said display is turned off.

An electric motor 3 (see FIG. 2) engages a gear 5 via a pinion 4. This arrangement serves to drive a carrier or support bracket 6 in a circular path. Gear 5 is fixed to the profile 1 by screws 7. Profile 1 also bears a bearing 8. The outer race 9 is fixed to profile 1 by screws 10, and the inner race 11 is fixed to the support bracket 6. Support bracket 6 has three holding devices (12, 13, 14) for a plasma cutting and milling machine device. The support 6 is disposed over the diameter of the inner race 11, and at its two end regions (FIG. 1) it is fixed to said race by screws 15 (FIG. 2). An arm 16 is borne on support 6 and bears holding means 17 (FIG. 1) having an eccentric bushing 18 the axis of which is perpendicular to the metal sheet, which constitutes the workpiece. Rollers 19 are disposed between the outer race 9 and the inner race 11 of the bearing 8, bearing 8 being a roller bearing.

The procedure for mounting the apparatus on a sheet metal strip 20 will now be described. After the defective locus on the sheet metal strip 20 has been located, said locus is measured in order to determine the size of the circular disc of sheet metal to be removed. Note that the sheet metal strip 20 may still be disposed in its associated production machine, e.g., a double strip press. A hole 21 is drilled or burned in said sheet metal. A centering pin 23 is inserted in the support 6 in the opening 22, which is centrally disposed with respect to the bearing 8. The piece comprising the ring-shaped profile 1 and the electromagnets 2 are then positioned over the sheet metal strip 20, such that the centering pin 23 penetrates said sheet metal strip. On the opposite side of the sheet metal strip (ordinarily the underside), centering is achieved via the collecting pan 24 and the centering pin 23, which pin 23 engages a recess 25 in pan 24. The collecting pan 24 is releasably held in place by soft iron anchoring means 26 and other holding devices, fastened by screws 27.

To cut out the disc to be excised from the sheet metal strip 20, first a plasma burner is actuated and then the electric motor 3 is started. This sequence ensures that at the start of the cutting, the plasma beam is not already burning into the surface, which would lead to undesirable widening of the cutting line. At the end of the cutting process, the sheet metal disc which has been excised falls into the collecting pan 24. The milling machine 28 is then moved with the aid of the electric motor 3, with guiding by the bearing 8 and the eccentric bushing 18, to provide more accurate machining of the cut line. If desired, the milling machine 28 may be adjusted to provide a chamfer on the cut line. The milling machine 28 is preferably driven by compressed air, and the milling machine cuttings are collected in the collecting pan.

Figure 3:
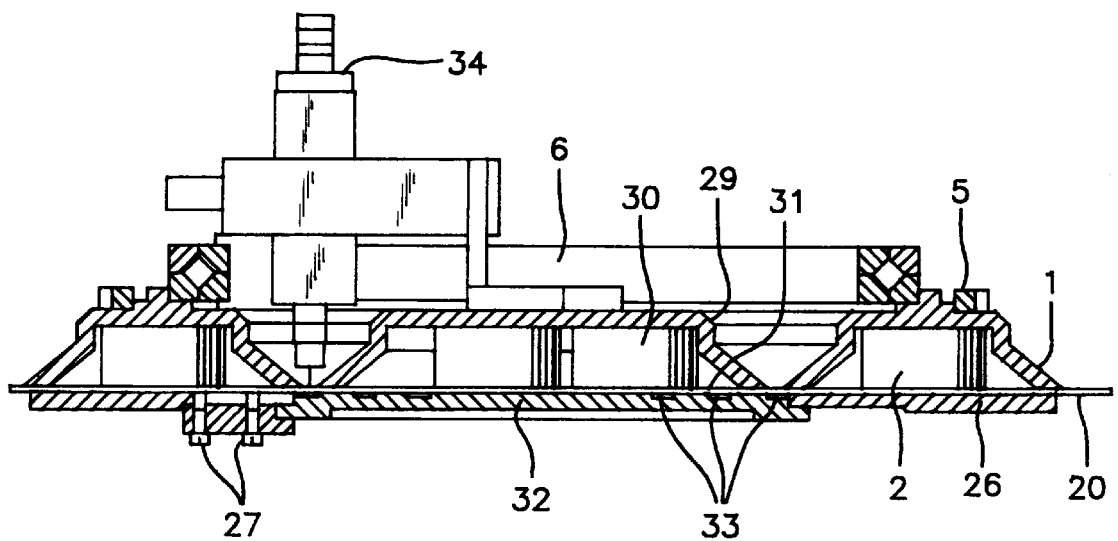
FIG. 3 is a cross section through line III—III of FIG. 1, of the apparatus according to FIG. 1, with the welding device and the centrally disposed auxiliary holding magnets for a sheet metal disc both in place.

After completion of the cutting and mechanical machining, the milling machine 28 is de-mounted. The collecting pan 24, along with the centering pin 23, are removed by loosening the bayonet joint fixed by the screws 27. As seen in FIG. 3, the support bracket 6 is connected to a profile 29 shaped like an inverted circular pan. The profile 29 has electromagnets 30 that facilitate placement and holding of a new, pre-fabricated sheet metal blank or disc 31. When the electromagnets 30 are actuated (i.e., turned on) they can support and hold in place the disc 31, facilitating the moving into place and holding of the base or backing 32 by the magnetic anchor 26. The backing 32 is comprised of soft iron and has ring-shaped grooves which bear copper rings 33. The distance of these copper rings 33 from the center of the bearing is adjusted to the distances of the holding devices (12, 13, 14) for the tungsten/inert gas welding (WIE) apparatus 34. With this arrangement, three different general sizes of sheet metal discs can be accommodated, corresponding to the different positions of the said holding devices and ring-shaped copper inserts.

The cross section shown in FIG. 4 corresponds essentially to that shown in FIG. 3, but vacuum suction elements 35 are provided instead of the electromagnets. The vacuum element 35 disposed in the hollow profile 1 is formed by a circular aluminum plate 36 bearing a ring-shaped groove 37 on its end face directed toward the sheet metal strip 20. Groove 37 bears a ring-shaped sealing element 38, e.g., an O-ring having diameter 7mm and enclosing an area of 177 sq cm, which sealing element 38 comes to abut the sheet metal strip 20.

Into the hollow space 39, of volume 88 sq cm, formed between the sheet metal strip 20, the sealing element 38, and the end face of the aluminum plate 36, a vacuum line 40 with diameter 16 mm opens. Vacuum line 40 connects as shown to a main vacuum line 41 also having a diameter of 16 mm. Line 41 in turn connects to a three-way valve which serves to allow air into space 39 or to apply vacuum from a vacuum pump (not shown) to said space 39. At times when the electromagnets would be actuated (in the embodiment of FIGS. 2 and 3 having electromagnets as holders of the sheet metal strip 20 during cutting and machining), in the present embodiment the vacuum elements 35 are actuated, by applying a vacuum, thereby holding the apparatus against the sheet metal strip 20. Vacuum elements 35a are also provided, which are analogous to the vacuum elements 35. Vacuum elements 35a serve to hold the support element 42, comprised essentially of the anchor 26, against the sheet metal strip 20. Corresponding vacuum lines (40, 41) are provided for vacuum elements 35a. The vacuum elements 35, 35a are connected in parallel, as shown in FIG. 5.

Figure 5:
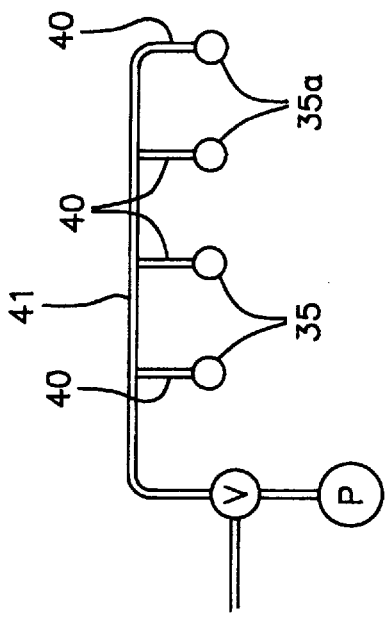
FIG. 5 is a schematic of the vacuum suction elements.

FIG. 5 is a schematic of the vacuum circuit for the vacuum elements (35, 35a), three-way valve V, and vacuum pump P. As seen, the vacuum elements (35, 35a) are connected in parallel to the main vacuum line 41 via their respective individual vacuum lines 40. The main line vacuum 41 is connected to the valve V. Depending on the position of the valve V, the hollow spaces of the vacuum elements (35, 35a) are connected to the atmosphere or to the vacuum pump.

Figure 6:
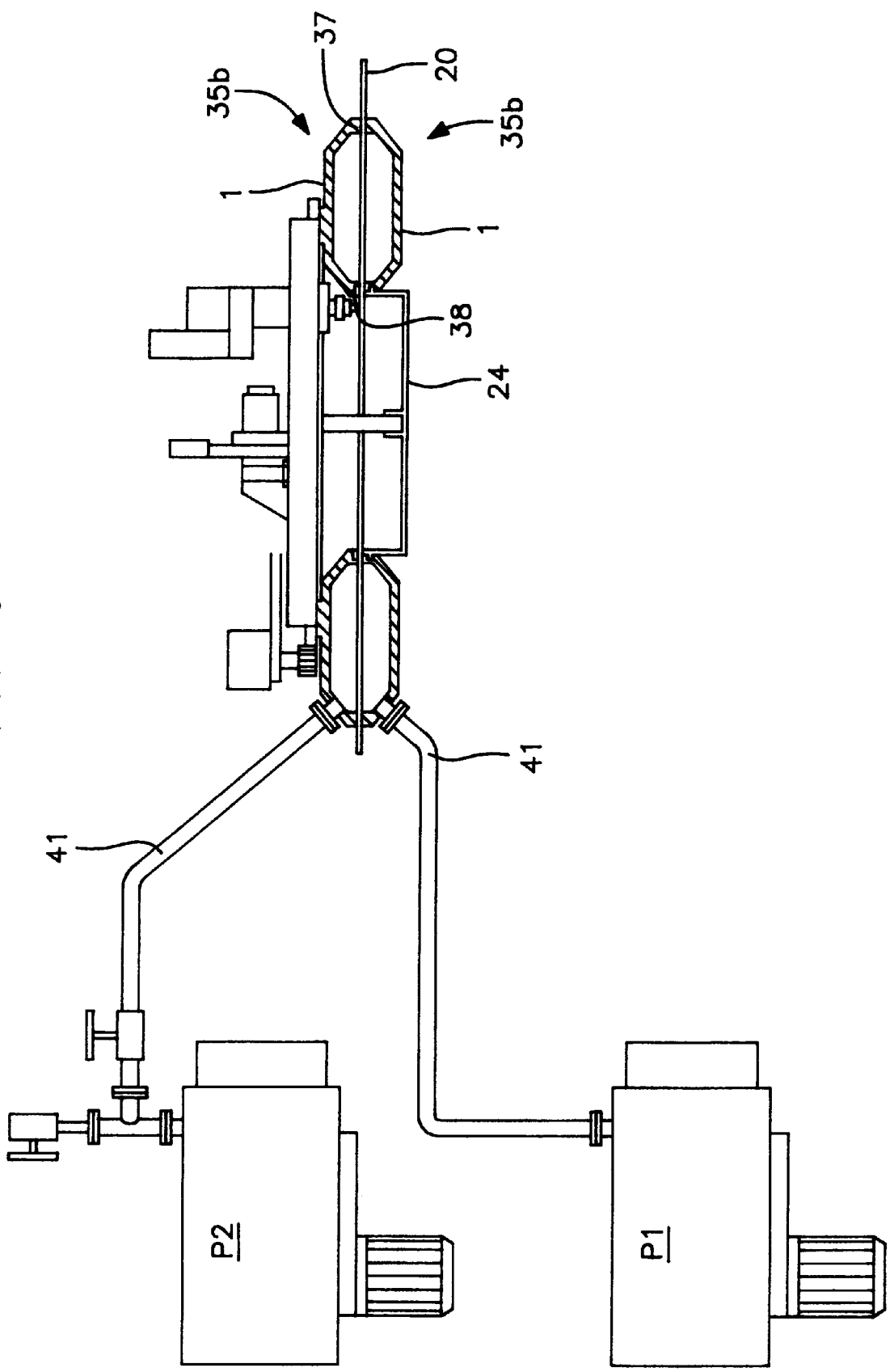
FIGS. 6 and 7 are cross sectional views of a cutting and welding apparatus corresponding to the view through line III—III of FIG. 1, but with ring-shaped vacuum suction elements.
Figure 7:
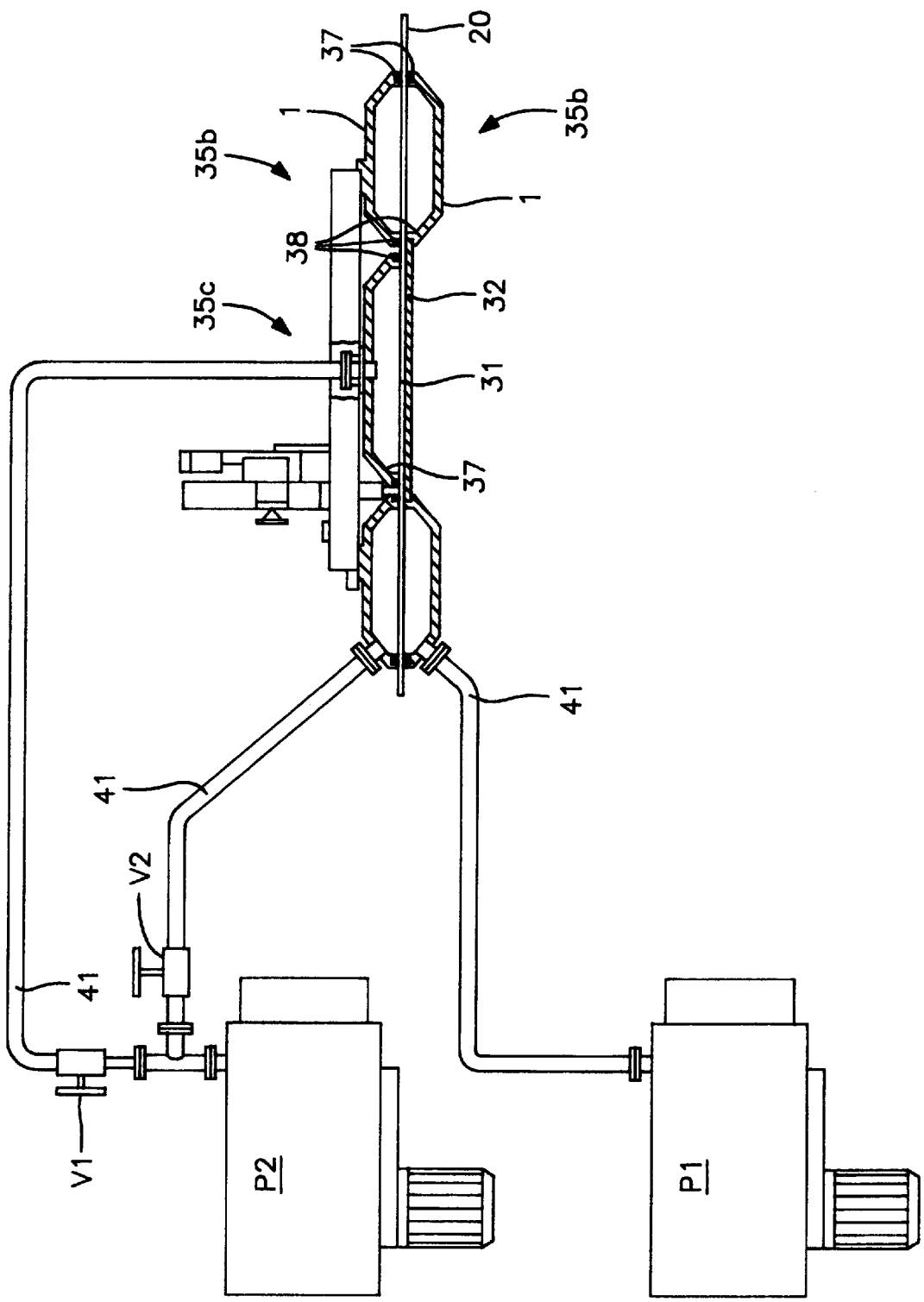

An electrically driven piston-type vacuum pump was used for exemplary embodiments according to FIGS. 5, 6, and 7. The power consumption of the electric motor was 0.55 kW; the average vacuum attainable was a low as 20 mbar. Vacuum pumping rate was 200 L/min. At 20 mbar the vacuum pumping rate was 90% of that at standard pressure. When the apparatus is applied against the sheet metal strip 20, the vacuum pump P is turned on and the hollow spaces are evacuated. The cutting of the sheet metal strip 20 is then carried out, any mechanical machining or the like is conducted as needed, and the sheet metal disc to be welded-in is placed in position. A collecting pan 24 and backing 32 may be employed, analogous to FIG. 2. After completion of the cutting and machining operations, air is admitted to the hollow spaces 39 via valve V, to facilitate removing the apparatus from the workpiece 20.

Figure 1:
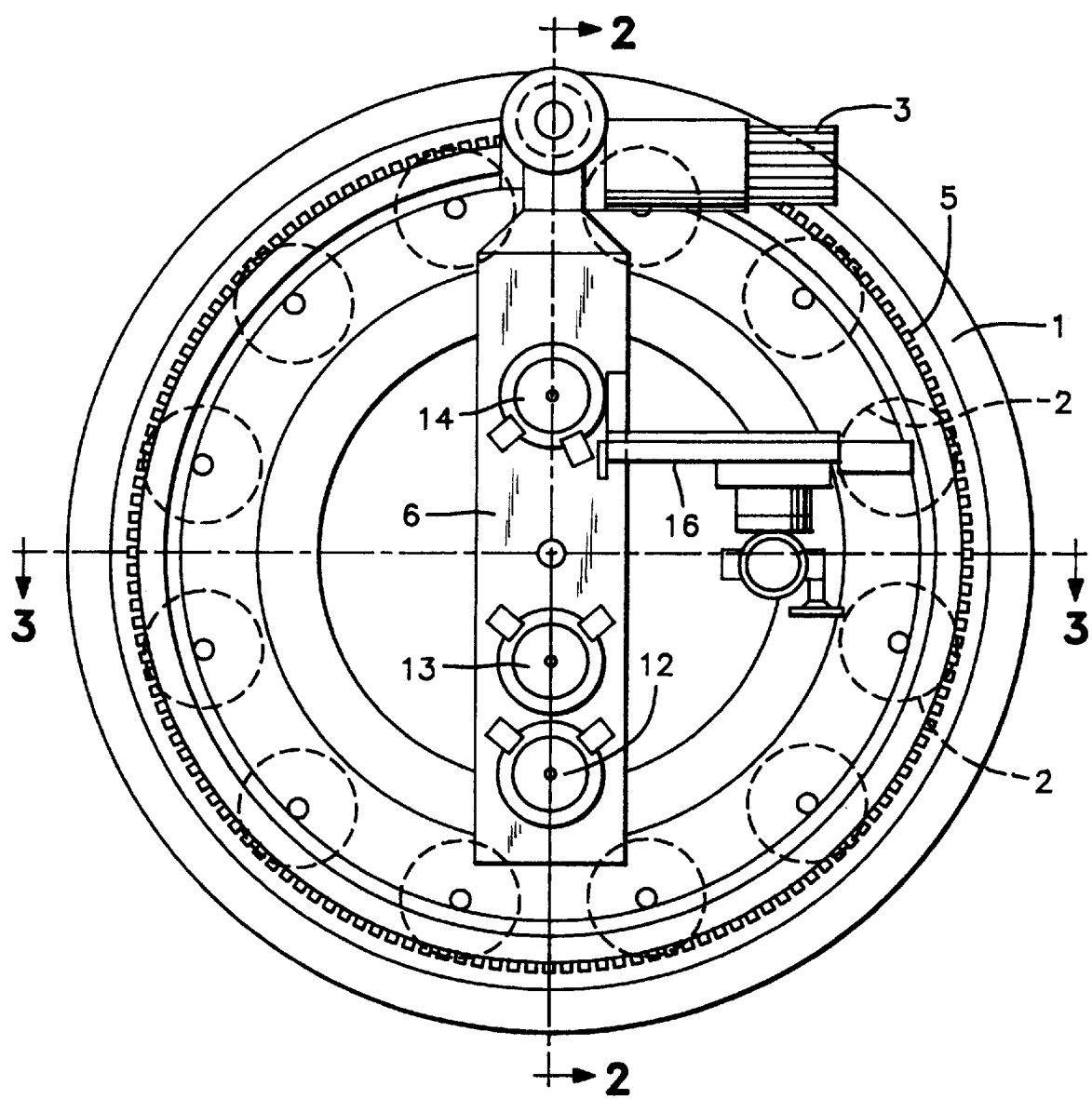
FIG. 1 is a top view of a cutting and welding apparatus.
Figure 2:
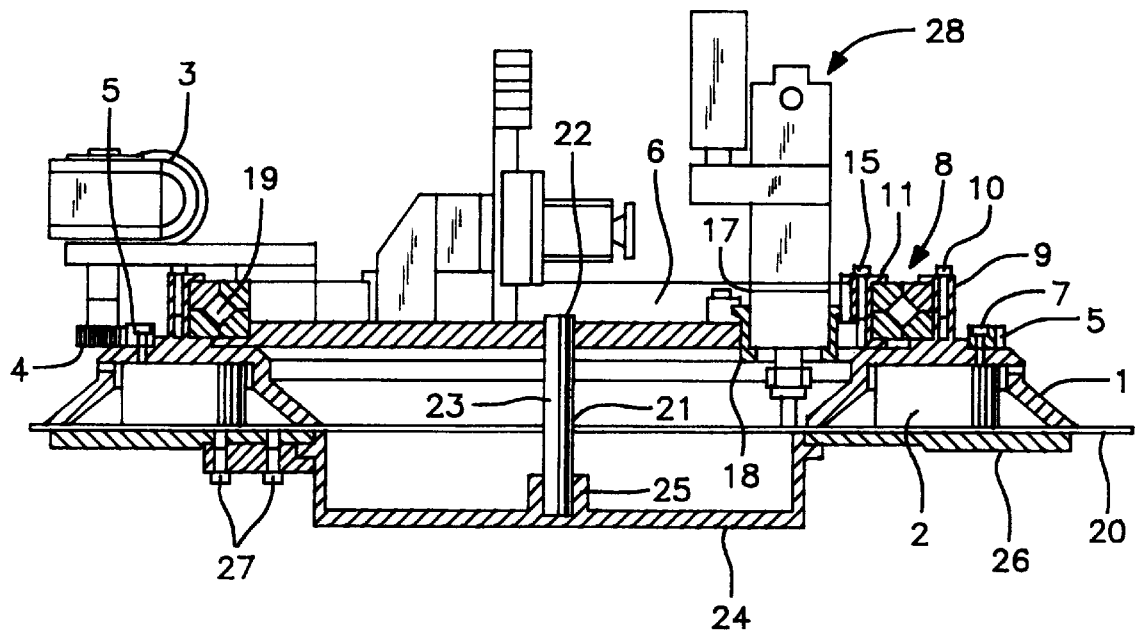
FIG. 2 is a cross section through line II—II of FIG. 1, of the apparatus according to FIG. 1, showing the milling machine installed.

The cutting and welding apparatus illustrated in FIGS. 6 and 7 corresponds to that of FIG. 1, but ring-shaped suction elements 35b are provided instead of electromagnets 2 or individual suction elements (35, 35a). These suction elements 35b are formed essentially by the ring-shaped hollow profiles 1. Circular grooves 37 bearing sealing elements 38 comprising O-rings having a circular cross section and diameter 7 mm are provided in the profiles 1. The ring-shaped vacuum elements are applied against the sheet metal strip 20 via these sealing elements 38, and are connected to the two vacuum pumps (P1, P2) via vacuum lines 41, as shown. The volume of each vacuum element is approximately 10.1 L. The lower ring-shaped vacuum element 35b may bear a collecting pan 24 (FIG. 6) which can collect any drippings from the welding and any cuttings from the machining operation(s).

In the embodiment shown in FIG. 7, a third vacuum element 35c is provided which is centrally located and has a volume of 0.4 L, 1.0 L, or 2.0 L, depending on the size of the sheet metal disc 31 to be welded-in. Element 35c serves to hold disc 31 in place. The lower ring-shaped vacuum element 35b serves to hold the backing 32, and is connected to its own vacuum pump P1. The upper ring-shaped vacuum element 35b and the central vacuum element 35c are connected to vacuum pump P2 via individual valves (V1, V2) and a T-connector.

In order to attach the apparatus as quickly as possible to the sheet metal strip workpiece 20, first the valve V2 is opened and the valve V1 is closed. After the desired vacuum is reached in the top vacuum element 35b, valve V2 is closed and valve V1 is opened, at which point evacuation of vacuum element 35c only is carried out. The vacuum pump P2 may then be left in operation, with both valves (V1, V2) being opened. Air can be admitted to all of the vacuum element (35b, 35c) by venting pumps (P1, P2). The procedure for cutting, machining, and welding of disc is analogous to that employed with the embodiment having electromagnets, as discussed in relation to FIGS. 1–3.

The welds described below were performed on two different sheet steel pieces having circular discs welded-in for the purpose of repairing areas where other discs had been excised. The thickness of the sheet steel was 2 mm and the replacement disc diameter was 300 mm. The excision was performed with a plasma cutter, followed by milling.

The steels had the following compositions:

Steel A:

| | |
|---|---|
| Carbon | ≦0.09 wt. % |
| Chromium | 15.0 wt. % |
| Nickel | 7.0 wt. % |
| Copper | 0.7 wt. % |
| Titanium | 0.4 wt. % |
| Remainder: iron and impurities. | |

Steel B:

| | |
|---|---|
| Carbon | ≦0.03 wt. % |
| Chromium | 14.5 wt. % |
| Nickel | 4.5 wt. % |
| Copper | 3.3 wt. % |
| Manganese | 0.75 wt. % |
| Silicon | 0.3 wt. % |
| Niobium | at least 5 times the wt. % of carbon |
| Remainder: iron and impurities. | |

In examples of welding of the sheet metal disc which were carried out, first the tungsten/inert gas welding apparatus 34 was moved through 60° using the electric motor 3. Then the disc to be tack welded was applied against the sheet metal strip 20, in a six-step process, followed by the welding. It was surprising that the weld seam could be executed in a single pass, with or without pulsed current, with the welding apparatus being moved along the locus of the weld seam being produced at a speed of 0.16 m/min. The welding wire used was of the same composition as the steel materials being welded. With the workpiece strip of thickness 2 mm, the wire was fed automatically at 350 mm/min. Voltage used was 220 V, and current 110 A. After completion of the welding, the electric power supply to all of the electromagnets and vacuum pump(s) was interrupted. The ring-shaped profile 1 with the electromagnets (and/or vacuum elements) was removed, as was the support 42 and, in particular, the ring-shaped anchor 26. The weld seam was then cold hardened by cold forming (viz., hammering), with positioning of a solid backing plate below the sheet metal strip. After the cold forming of the weld seam, the seam was ground down to the thickness of the sheet metal strip, and then the weld seam and the disc were cleaned and polished. If necessary, heat treatment (e.g., annealing and/or tempering) may be carried out prior to said cleaning and polishing. A tungsten/inert gas welding apparatus is particularly well suited for the welding, and a plasma cutting apparatus is particularly well suited for the cutting; compressed air is needed for both of these devices.

The sheet steel strip employed in the examples which were carried out with an endless strip in a double-strip press according to Ger. OS 4,107,833 which is hereby incorporated by reference.

The foregoing description should be considered as illustrative only of the principles of the invention. Since numerous modifications and changes will readily occur to those skilled in the art, it is not desired to limit the invention to the exact construction and operation shown and described, and, accordingly, all suitable modifications and equivalents may be resorted to, falling within the scope of the invention.

I claim:

1. An apparatus for cutting sheet metal discs from and welding sheet metal discs to an endless sheet metal strip, said apparatus comprising:

guide means for securing a cutting apparatus, machining apparatus or a welding apparatus;

a backing positioned to support a weld seam to be produced;

at least one electromagnet or at least one vacuum element connected to at least one vacuum pump for holding the guide means against the sheet metal strip; and holding means for securing the machining, cutting or welding apparatuses to be moveable along the guide means by action of a motor.

2. The apparatus for cutting and welding sheet metal discs according to claim 1, further comprising a ring-shaped support element having holding means for the backing, the support element supporting a collecting pan, and said holding means are releasable and are connected to the support element.

3. The apparatus for cutting and welding sheet metal discs according to claim 1, wherein the guide means are comprised of a bearing that is connected on one side to a profile and on a second side to a support bracket.

4. The apparatus for cutting and welding sheet metal discs according to claim 3, wherein the support bracket extends diametrically over the bearing.

5. The apparatus for cutting and welding sheet metal discs according to claim 3, wherein the support bracket has a plurality of holding means, each of which is disposed at a different distance from a center of the bearing.

6. The apparatus for cutting and welding sheet metal discs according to claim 3, wherein the motor is borne on the support bracket and drives a pinion which engages a toothed rim disposed concentrically with the bearing, and said rim is held by the at least one electromagnet or the at least one vacuum element.

7. The apparatus for cutting and welding sheet metal discs according to claim 6, wherein the toothed rim has outwardly directed teeth.

8. The apparatus for cutting and welding sheet metal discs according to claim 3, wherein the support bracket has an arm which bears an additional holding device.

9. The apparatus for cutting and welding sheet metal discs according to claim 3, wherein the support bracket has a central opening having an axis which is normal to the sheet metal strip.

10. The apparatus for cutting and welding sheet metal discs according to claim 9, further comprising a centering pin disposed in the opening, the pin extending downwardly through the sheet metal strip, wherewith said pin is centered with the support bracket, which centering is accomplished by a collecting pan.

11. The apparatus for cutting and welding sheet metal discs according to claim 3, wherein the at least one vacuum element or the at least one electromagnet are disposed in a hollow profile which has a generally ring-like shape, wherewith said profile bears an outer race of the bearing and a toothed rim.

12. The apparatus for cutting and welding sheet metal discs according to claim 1, further comprising at least one additional electromagnet or vacuum element connected to a support bracket and disposed between the support bracket and the sheet metal disc.

13. The apparatus for cutting and welding sheet metal discs according to claim 1, wherein the backing is comprised of ferromagnetic material, and has inserts comprised of copper in a region of a weld seam which is to be produced, wherewith the material of said inserts is immiscible with the material of the weld seam.

14. The apparatus for cutting and welding sheet metal discs according to claim 1, further comprising a support bracket having an arm with a holding device for an eccentric bushing for a milling machine, the support bracket further having an axis disposed approximately perpendicularly to the plane of the sheet metal strip.

15. The apparatus for cutting and welding sheet metal discs according to claim 1, wherein the at least one vacuum element or the at least one electromagnet are disposed in a hollow profile which has a generally ring-like shape.

16. The apparatus for cutting and welding sheet metal discs according to claim 1, wherein the at least one vacuum element is formed by a hollow profile, wherewith a sealing element is provided on an end face of said profile directed toward the sheet metal strip to form a seal between said profile and said sheet metal strip.

17. An apparatus for cutting sheet metal discs from and welding sheet metal discs to an endless sheet metal strip, said apparatus comprising:

guide means for securing a cutting apparatus, machining apparatus or a welding apparatus;

a backing positioned to support a weld seam to be produced;

at least one electromagnet for holding the guide means against the sheet metal strip;

holding means for securing the machining, cutting or welding apparatuses to be moveable along the guide means by action of a motor; and at least one anchor element associated with the at least one electromagnet, at a face of the sheet metal strip opposite from the at least one electromagnet.

18. The apparatus for cutting and welding sheet metal discs according to claim 17, further comprising a ring-shaped support element having holding means for the backing, the support element supporting a collecting pan, and said holding means are releasable and are connected to the support element.

19. The apparatus for cutting and welding sheet metal discs according to claim 17, further comprising at least one additional electromagnet or vacuum element connected to a support bracket and disposed between the support bracket and the sheet metal disc.

* * * * *